United States Patent [19]
Soltys

[11] Patent Number: 6,017,580
[45] Date of Patent: Jan. 25, 2000

[54] SILVER FILM INCORPORATING PROTECTIVE INSOLUBLE METALLIC SALT PRECIPITATE

[75] Inventor: Joseph Soltys, London, Canada

[73] Assignee: Lilly Industries, (USA), Inc., Indianapolis, Ind.

[21] Appl. No.: 09/143,685

[22] Filed: Aug. 28, 1998

[51] Int. Cl.[7] ................. B05D 5/06; B05D 5/00
[52] U.S. Cl. ............. 427/162; 427/165; 427/168; 423/DIG. 8
[58] Field of Search .................. 427/165, 168, 427/162; 423/92, 93, DIG. 8

[56] References Cited

U.S. PATENT DOCUMENTS

| | | | |
|---|---|---|---|
| 4,490,482 | 12/1984 | Mathieu | 502/339 |
| 4,737,188 | 4/1988 | Bahls | 106/1.23 |
| 5,156,917 | 10/1992 | Sanford | 428/426 |
| 5,240,776 | 8/1993 | Servais et al. | 428/434 |
| 5,292,354 | 3/1994 | Hecq et al. | 65/31 |
| 5,296,297 | 3/1994 | Servais et al. | 428/426 |
| 5,374,451 | 12/1994 | Servais et al. | 427/165 |
| 5,419,926 | 5/1995 | Soltys | 427/305 |
| 5,487,779 | 1/1996 | Sinko | 106/480 |

*Primary Examiner*—Shrive Beck
*Assistant Examiner*—Michael Cleveland
*Attorney, Agent, or Firm*—DeLio & Peterson LLC

[57] ABSTRACT

A method is provided for making mirrors having enhanced reflective layer resistance to corrosion. The reflective layer of the mirror, typically silver, is contacted, preferably simultaneously, with a first solution containing a specific cation and a second solution containing a specific anion, or alkaline material which forms hydroxyl ions, the specific cation and specific anion or hydroxyl ion reacting to form a water insoluble precipitate on the silver surface. The mirror may then be painted to provide additional corrosion resistance to the mirror. The method eliminates the need for a copper layer on the silver surface and the method may be incorporated into existing mirror production lines as a replacement for the copper layering step. Also provided are an apparatus for making the mirrors and the mirrors made using the method and apparatus of the invention. A preferred cation containing solution contains tin (e.g., $SnCl_2$) and a preferred anion containing solution contains hydroxyl ions (e.g., NaOH).

11 Claims, No Drawings

SILVER FILM INCORPORATING PROTECTIVE INSOLUBLE METALLIC SALT PRECIPITATE

BACKGROUND OF THE INVENTION

1. Field of the Invention

This invention relates to mirrors, and to a method for making mirrors comprising applying a reflective layer such as silver to a glass surface and, in particular, to treating the silver surface to provide enhanced corrosion resistance of the silver surface and mirror without the need for a corrosion inhibiting copper layer on the silver surface.

2. Description of Related Art

For convenience, the following description will be directed to mirrors and improving the corrosion resistance of the reflective layer used to make the mirror but it will be understood to those skilled in the art that other metal containing substrates and metal particles may be treated using the method and apparatus of the invention to enhance the corrosion resistance of the metal.

Typical mirrors are made of a glass sheet and a thin layer of a reflective metallic film applied to the back of the sheet. The metallic film layer applied directly to the glass is usually a film of silver, although other metallic films may also be used, such as copper. When silver is used as the primary reflective layer, it is commonly protected by a second metallic film layer of copper to inhibit corrosion of the silver layer. A layer of paint is also typically used over the silver or copper layer for enhanced corrosion and abrasion resistance. Each step in the mirror making process is usually performed in an automated process with the glass sheet positioned horizontally as the sheet moves continuously through the various steps of the process. The time and need for each step is therefore very important from a commercial standpoint and the elimination of a step or substitution of a more efficient and environmentally acceptable step is a continuing goal of industry.

Mirrors are generally made continuously by a sequence of steps on a mirror conveyor. The first step lightly polishes and cleans the glass surface and after rinsing, the next step sensitizes the surface with an aqueous stannous chloride solution. The silver film layer is then deposited on the sensitized glass surface by one of many methods such as described in U.S. Pat. No. 4,737,188 to Bahls. Typically, an ammoniacal silver nitrate solution and a reducing agent solution containing a strong base are sprayed on and combined at the sensitized glass surface to deposit the silver film. Thereafter, a copper film may be applied to and over the silver film by any of a variety of prior art procedures such as a galvanic process which utilizes an aqueous suspension of iron powder and an aqueous solution of copper sulfate or by the disproportionation of cuprous ions on the silver surface. The latter process is described in U.S. Pat. No. 5,419,926 to Soltys. The copper layer is normally painted to produce the finished mirror, or another protective coating such as a hardened organic resin incorporating a corrosion inhibitor may likewise be applied as shown in U.S. Pat. No. 5,156,917 to Sanford. The above patents are hereby incorporated by reference. A standard mirror making process thus comprises a series of steps which steps are performed in sequence on a conveyor as part of a continuous mirror making process.

A serious problem of the mirror manufacturing industry is the need for a copper layer on the silver layer to inhibit corrosion of the silver. The application of copper to the silver surface necessarily produces copper containing waste streams which must be environmentally treated or processed for recycling. Typically, the copper streams are treated to remove copper before discharge to the effluent and this procedure is complex and costly. The copper film on the mirror is also a weak link in the life of a conventional mirror. The copper film is easily corroded when the mirror is subjected to ammonia or alkaline glass cleaners because these cause the edges of mirrors to corrode and turn black in color thereby shortening the life of the mirror.

A number of patents have been issued for improving treatment of the silver surface in the mirror making process to eliminate the copper layering step. In U.S. Pat. No. 5,374,451 to Servais et al., a mirror is shown having a reflective layer of silver which has been treated with a solution containing ions of at least one of the group consisting of: Cr (II); V (II or III); Ti (III or II); Fe (II); In (I or II); Cu (I); and Al (III). The solution may also contain Sn(II) ions. It is preferred in the patent that a protective layer of paint still be used to protect the treated silver layer. A similar treatment is disclosed in U.S. Pat. No. 5,240,776 which uses stannous ions to contact the silver layer followed by a silane treatment.

All the above patents are incorporated herein by reference.

Unfortunately, current methods of treating the silver surfaces of mirrors to inhibit corrosion thereof are unreliable, and specially developed corrosion inhibiting coatings are required, and the processes of U.S. Pat. Nos. 5,240,776 and 5,374,451, supra, only treat the silver surface with a simple metal solution to augment the metal atoms on the silver surface as stated in the U.S. Pat. No. 5,240,776 patent but which processes may not be entirely effective for the myriad of mirror products made in industry.

Bearing in mind the problems and deficiencies of the prior art, it is an object of the present invention to provide a method for making mirrors wherein the copper layering process is replaced with an environmentally friendly process step which protects the silver layer against corrosion and which may be used in existing commercial mirror making conveyor systems without having to add extra sections to the system.

It is another object of the present invention to provide a method for enhancing the corrosion resistance of a metal surface such as the silver surface of a mirror and, additionally, to treat the silver surface of the mirror to enhance the corrosion resistance of the silver.

It is a further object of the invention to provide an apparatus for making mirrors without the need for the copper layering step.

Another object of the invention is to provide an improved corrosion inhibiting mirror and other metal substrate and metal articles of manufacture.

Still other objects and advantages of the invention will in part be obvious and will in part be apparent from the specification.

SUMMARY OF THE INVENTION

The above and other objects and advantages, which will be apparent to those skilled in the art, are achieved in the present invention which is directed to, in a first aspect, a method for making mirrors having enhanced reflective metal, e.g., silver, corrosion resistance and to eliminate the need for a copper protective layer on the reflective layer, the method comprising:

supplying a glass substrate;

sensitizing the glass substrate by one of several prior art methods;

coating a layer of silver on the glass substrate;

contacting the silver coated glass substrate with a first solution containing a specified cation and a second solution containing a specified anion, or alkaline material which forms hydroxyl ions, preferably simultaneously by spraying or otherwise directing streams of the solutions so that the two solutions meet at the silver surface, the specified cation and specified anion or hydroxyl ion being reactive to form a water insoluble precipitate on the silver surface, which precipitate enhances the corrosion resistance of the silver layer.

The reaction of the first solution and the second solution may generally be shown by the following equation:

wherein A is the specified cation, D is the specified anion or alkaline material, AB and CD are water soluble compounds and BC is a water soluble reaction product and AD is a water insoluble reaction product precipitate of the specified cation A and specified anion or hydroxyl ion D. The ↓ indicates a precipitated compound. When the first solution AB and second solution CD are mixed, a supersaturated solution of product AD is formed and an opalescent mixture is obtained showing the presence of a precipitate.

The treated silver surface may be optionally painted or otherwise coated to provide the mirror product. Any organic-based mirror backing paint may be used, leaded or lead-free, and water-based mirror backing paint being a typical and alternate paint. Lilly Industries mirror backing paints are preferred.

In another aspect of the invention a method for enhancing the corrosion resistance of a metal coating such as the silver surface of a mirror comprises contacting the metal coating with a first solution containing a specified cation and a second solution containing a specified anion, or alkaline material which forms hydroxyl ions, preferably simultaneously by spraying or otherwise directing a stream of each solution so that the solutions meet at the metal coating surface, the specified cation and specified anion or hydroxyl ion being reactive to form a water insoluble reaction product precipitate on the metal surface to enhance the corrosion resistance of the metal surface.

In another aspect of the invention, either the first solution containing a specified cation or the second solution containing a specified anion, or alkaline material which forms hydroxyl ions, may be applied separately and then the other solution applied to form the reaction product precipitate. For this technique it is preferred that the solution first applied to the surface be maintained in a liquid form on the metal surface so that the cations and anions or hydroxyl ions of the solution are in the ionized form and suitable for reaction with the solution applied thereto to form the reaction product precipitate.

In a further aspect of the invention, an apparatus is provided for making mirrors comprising:

means for moving a sheet of glass preferably along a horizontal path;

means for cleaning the sheet of glass to remove oils, grease, powder, interleaving material, etc.;

means for sensitizing the cleaned sheet of glass by one of several known methods to promote silver deposition thereon;

means for applying a layer of silver on the sensitized glass surface;

means for contacting a first solution containing a specified cation and a second solution containing a specified anion, or alkaline material which forms hydroxyl ions, at the silver surface, preferably simultaneously, the specified cation ion and specified anion or alkaline material reacting to form a water insoluble reaction product precipitate on the silver surface;

means for optionally applying a silane treatment over the precipitate by techniques known to those familiar with the art; and means for optionally painting or applying another protective layer on the precipitate to form the mirror product.

In another aspect, an improved mirror and other metal substrate and metal articles of manufacture are provided made by the method and/or apparatus of the invention.

In another aspect of the invention, the precipitated protective layer can comprise more than one substance such as a hydroxide of a specified cation along with the reaction product AD.

The term "water insoluble reaction product precipitate" is intended to mean that the precipitate is substantially insoluble in water as will be understood by those skilled in the art. The solubility product constant in water at 25° C. should generally be less than $K_{SP}=10^{-6}$, and preferably less than $K_{SP}=10^{-8}$.

DETAILED DESCRIPTION OF THE INVENTION

The glass substrate on which the mirror is made may be any of the conventional glasses used in mirror making manufacture. Such glasses include soda lime glass and other conventional glass products. The conventional method of preparing the glass substrate to make a mirror is to clean the glass to remove grease, oil, etc. using cerium oxide and/or a detergent. Other substrate materials such as plastics, including Lexan and polycarbonate, may also be used as a metal covered or coated substrate. Metal particles such as silver flakes and powders, metal (silver) coated mica, metal (silver) coated metal particles, e.g., Ni or Cu, and the like may also be treated using the method and apparatus of the invention to increase the corrosion resistance of the metal particles.

After the glass surface has been cleaned and preferably rinsed, it is then sensitized using, for example, conventional sensitizing solutions. In general a conventional stannous ion solution is preferably used. The sensitizing solution can be applied to the glass surface by pouring, immersion, dipping, spraying or rinsing the solution over the glass surface. An acidic stannous solution is generally used to sensitize the glass surface, although the stannous solution alone can be used if it is prepared shortly before use. A stannous ion concentration 10–1000 mg/l and a pH of 2–5 is typically employed but these sensitizing solutions may vary widely in composition and concentration.

The silver film is then applied to the sensitized glass surface following conventional coating techniques such as described in U.S. Pat. No. 4,737,188, supra. Basically, a silver solution and a reducing solution are brought together before or at contact with the substrate to be silvered by pouring or metering the solutions such that they meet just before contact with the substrate. Alternatively, the component solutions may be sprayed using an air or airless system prior to or simultaneously with intermixing at the surface of the substrate.

The corrosion resistance of the silver film is enhanced by using the method and apparatus of the invention which broadly comprises forming a water insoluble reaction product precipitate on the silver surface. The specified cation containing solution and specified anion, or alkaline material which forms hydroxyl ions containing solution which react to form the water insoluble reaction product precipitate may be employed at varying concentrations, temperatures and silver contacting conditions. The solution temperature may vary widely up to boiling, e.g., 5° C. to 95° C. and it is preferred that a solution temperature of about 20° C. to about 45° C., preferably 25°, be used. A contact time on the silver surface of the two solutions is up to about 2 minutes, e.g., 5 seconds to 2 minutes, preferably 20–40 seconds, e.g., 30 seconds. A concentration up to saturation may be employed with generally a stoichiometric amount being used. Amounts of 0.01 mM to 0.1M of specific cation solution have been found useful.

Any suitable water soluble components may be employed to form the reacting solutions with the proviso that the specified cation of one of the solutions and specified anion or alkaline material which forms hydroxyl ions of the other solution react to form a water insoluble precipitate of the specified cation and specified anion or hydroxyl ion on the metal surface. Exemplary specific cations include $Sn^{2+}$, $Bi^{3+}$, $Ag^+$, $Zn^{2+}$, $Pb^{2+}$, $Ce^{3+}$, $Al^{3+}$, $Fe^{2+}$, $In^{3+}$ and $La^{3+}$ cations. Titanium cations, $Ti^{3+}$, may be added as a secondary cation in a minor amount, preferably with the stannous cation in, for example, an 80%/20% ratio of $Sn^{2+}$ to $Ti^{3+}$.

Desirable stannous salts include stannous chloride ($SnCl_2$), stannous fluoride ($SnF_2$), stannous sulfate ($SnSO_4$), stannous bromide, stannous fluorborate, and stannous methane sulfonate, preferably stannous fluoride. Stannic tin, $Sn^{4+}$, in the form of $SnCl_4$, $SnF_4$ or $SnBr_4$, for example, may also be added in minor amounts to the stannous solution, such as in an 90%/10% ratio of stannous to stannic, or used alone as the cation.

Exemplary specific anions or hydroxyl ions include $OH^-$, $CO_3^{2-}$, $HPO_3^{2-}$, $SiO_3^{2-}$, $B_4O_7^{2-}$, and $BO_2^-$ anions. The alkaline materials which form hydroxyl ions may vary widely and are generally compounds of Group I and Group II elements such as NaOH, KOH, LiOH, RbOH, CsOH, $Mg(OH)_2$, $Ca(OH)_2$, $Sr(OH)_2$, $Ba(OH)_2$, $NaBO_2$ and $Na_2B_4O_7$. Soluble compounds of the Group I and Group II cations which form hydroxyl ions are also included such as alkaline salts of weak acids such as sodium carbonate, trisodium phosphate, sodium borate, sodium silicate, sodium phosphite, and the like. Another source of hydroxyl ions is aqueous ammonia ($NH_4OH$) and other amines such as hydrazine, free base hydroxyl amine, aliphatic amines, hydroxyl amines such as ethanolamine and polyamines. Ammonia gas and other gases may be used as one of the reactants to form the metallic salt precipitate.

The solutions, particularly the cation containing solutions, may be prepared and used immediately as-is, or may be slightly acidified for storage purposes to increase their shelf life. Typically an acid such as HCl, $H_2SO_4$, $HNO_3$, acetic, lactic, glycolic, formic or other organic acid may be used to provide a pH up to about 6, preferably 1–3. Also contemplated herein are the use of solutions containing multiple specific cations and/or multiple specific anions or alkaline materials and/or the use of multiple solutions containing one or more specific cations and one or more specific anions or alkaline materials to form a mixed water insoluble reaction product precipitate on the silver surface. Silanes are conventionally used to provide adherence between the silver coating and paint as described in U.S. Pat. No. 5,240,776, supra, and such techniques can be used herein. It is understood that each solution contains both cations and anions or hydroxyl ions for electron neutrality with the condition that the specific cation of one solution and the specific anion or hydroxyl ion of the other solution react to form a water insoluble precipitate.

The reaction product water insoluble precipitate coated silver film is then preferably rinsed and may be painted using conventional paints and techniques or covered with a polymer coating to provide a finish surface which will further protect the mirror against abrasion and corrosion of the silver film.

It will be appreciated by those skilled in the art that since the mirror making process comprises a series of steps, each step is important to the mirror making process and that an improvement to any of the steps will improve the mirror making process and the resulting mirror. It is an important feature of the invention that the precipitate producing step may be used on existing mirror production lines since it replaces the environmentally undesirable copper layering process step with the environmentally friendly precipitate coating step. The mirrors made according to the invention have enhanced mirror properties, particularly enhanced resistance to corrosion and, consequently, a longer useful mirror life.

The mechanism of how the precipitate coats the silver surface is not known, but a substantial amount of precipitate coats the silver surface in a sufficient quantity to be detected with chemical spot checks of the surface (e.g., by a chemical spot test described in Example 1) or by EDS (Energy Dispersive Spectroscopy) equipment. For example, using a $SnCl_2$ solution (62.3 mM) and NaOH solution (140 mM) and spraying the solutions so they meet at a silver surface, it has been determined that the thickness of the formed precipitate is between 86 Å and 114 Å. This is significantly thicker than a single molecular monolayer resulting from contacting a silver surface with a single solution of a metal salt. A single molecular monolayer would have a thickness generally less than 2 Å.

Using $SnCl_2$/NaOH EDS (Energy Dispersive Spectroscopy) found 2 to 3 mg per sq. ft, which is (3/70) 100% Sn/Ag=4.2% Sn/Ag. 70 mg/ft$^2$ of silver is typical on a mirror. This is about 100 times more tin on the surface than when the silver surface is treated with only a $SnCl_2$ solution as in U. S. Pat. No. 5,240,776, supra. That the EDS method compared the entire silver film to tin content is evident from the fact that Si, Ca, Mg, Na were detected (i.e., glass components) which means that the electron beam traveled all the way through the silver film during the reading process.

The following non-limiting examples are provided to illustrate the method of the invention.

The examples have been subjected to different accelerated aging tests.

One indication of the resistance to aging of a mirror incorporating a metallic film is given by subjecting it to a copper-accelerated acetic acid salt spray test known as the CASS Test in which the mirror is placed in a testing chamber at 50° C. and is subjected to the action of a fog formed by spraying an aqueous solution containing 52 g/l sodium chloride, 0.2 g/l anhydrous cuprous chloride with sufficient glacial acetic acid to bring the pH of the sprayed solution to between 3.1 and 3.3. Full details of this test are set out in International Standard ISO 3770. Mirrors may be subjected to the action of the saline fog for different lengths of time, whereafter the reflective properties of the artificially aged mirror may be compared with the reflective properties of the freshly formed mirror. As outlined in ISO 3770, an exposure time of 120 hours gives a useful indication of the resistance of a mirror to aging. The CASS Test was performed on 10 cm by 10 cm square (100 square cm) mirror coupons, and after exposure to the copper-accelerated acetic acid salt spray for 120 hours, each coupon was subjected to microscopic examination. The principal visible evidence of corrosion was both a darkening of the silver layer and peeling of the paint around the margins of the mirror. The extent of corrosion is noted along the entire portion of all four edges of the coupon, and the mean of these measurements is calculated.

A second indication of the resistance to aging of a mirror incorporating a metallic film can be given by subjecting it to a U.S. Federal Specification Salt Fog Test(DD-M-00411C) which comprises subjecting the mirror in a chamber maintained at 35° C. to a salt fog formed by spraying an aqueous solution containing 230 g/l sodium chloride. An exposure time of 300 hours to the Salt Fog Test gives a useful indication of the resistance of a mirror to aging. The mirrors were subjected to microscopic examination, and the corrosion present at the margin of the coupon is measured to obtain a corrosion result in micrometers, in the same way as in the CASS Test.

EXAMPLE 1

The formation of water insoluble precipitates on a silver coated glass surface was performed by spraying two (2) solutions together on a sheet about 12 inch×24 inch so the solutions met at the surface and was used to simulate such a treatment step in a commercial conveyor mirror making system. All samples were coated with a low lead content mirror backing paint with a measured dry film thickness of 1.0 to 1.2 mil (0.025 to 0.030 mm) after full baking to about 130° C. for 2 minutes at that temperature. 6 inch×6 inch square samples were then cut from the layer sheet for testing. The following specific cation containing solutions and specific anion containing solutions as shown in Table I were used. All solutions formed a precipitate when combined at the silver surface. A silver coated glass surface without any treatment was used as one control and another silver coated glass surface coated with a conventional copper layer was used as the other control.

Microscopy/Energy Dispersive Spectroscopy). The amount of tin metal was determined to be between 2.40 mg/ft$^2$ and 3.22 mg/ft$^2$. The total eight of the tin precipitate would of course be higher based on the molecular weight of the insoluble tin precipitate components formed on the silver surface.

Spraying of the panel with only a SnCl$_2$ solution did not leave any detectable tin on the silver surface using the spot test or EDS method.

The results clearly show the enhanced corrosion resistance of a reaction product precipitate coated silver mirror treated according to the invention.

Several additional spot tests as described below were performed on the tin precipitated silver surface (without paint) of Run 4. The first test uses two solutions: concentrated sulfuric acid diluted 1:75, and a silver nitrate solution, 2 mg/mL. Two drops of the silver solution were placed on a sample with the tin ppt. and a silver only panel. Then two drops of acid were added to the silver solution treated surface. Almost instantly, the tin precipitate sample formed an intricately divided ring-like pattern with a brown-black tint on the film surface. The silver only sample formed a very slight milky-white haze on the film surface. This test showed that the presence of the tin precipitate can be confirmed. The spot test results in the dissolution of the protective precipitate which reacts with the silver nitrate to form black/brown colloidal silver, i.e., $$Sn^{2+}+2Ag^+ \rightarrow 2Ag^0+Sn^{4+}$$

The second qualitative test was similar in nature. The same silver solution was used, but nitric acid was used instead of the sulfuric. The nitric acid was again diluted 1:75. Two drops of silver solution were placed both on the tin precipitate panel and on the silver only panel. Then two drops of nitric acid were applied to the silver on each panel. The solutions were allowed to react for 20–30 seconds. The solutions were rinsed from the panels with deionized water. The panel with the tin precipitate remained intact while the silver on the untreated panel delaminated from the glass. This test showed that the tin reaction product compound present on the silver film protected the integrity of the silver film in the presence of materials known to delaminate silver from glass.

TABLE 1

| RUN No. | CATION SOLN | CONC. (mM) | ANION SOLN | CONC. (mM) | EDGE FAILURE SALT (μm) | EDGE FAILURE CASS (μm) |
|---|---|---|---|---|---|---|
| A |  |  |  |  | 2420 | 700 |
| B |  |  |  |  | 4080 | 2310 |
| 1 | SnCl$_2$ | 0.062 | NaOH | 0.14 | 480 | 312 |
| 2 | SnCl$_2$ | 0.62 | NaOH | 1.40 | 360 | 216 |
| 3 | SnCl$_2$ | 6.3 | NaOH | 14.0 | 390 | 222 |
| 4 | SnCl$_2$ | 62.3 | NaOH | 140. | 546 | 150 |
| 5 | SnCl$_2$ | 0.062 | Na$_2$CO$_3$ | 0.14 | 450 | 126 |
| 6 | SnCl$_2$ | 0.62 | Na$_2$CO$_3$ | 1.40 | 570 | 210 |
| 7 | SnCl$_2$ | 6.23 | Na$_2$CO$_3$ | 14.0 | 360 | 180 |
| 8 | SnCl$_2$ | 62.3 | Na$_2$CO$_3$ | 140. | 500 | 150 |
| 9 | SnCl$_2$ | 3.12 | NH$_4$OH | 10.0 | 270 | 282 |
| 10 | SnCl$_2$ | 6.23 | Na$_2$HPO$_3$ | 6.94 | 560 | 282 |
| 11 | SnCl$_2$ | 6.23 | (NH$_4$)$_2$CO$_3$ | 10.4 | 342 | 282 |
| 12 | SnF$_2$ | 4.78 | Na$_2$SiO$_3$ | 9.01 | 320 | 180 | mM = millimolarity
A = Control with copper coating
B = Control with silver only

Run No. 4 was measured for the amount of tin present on the silver surface by SEM/DS (Scanning Electron The third test is described in the book "Mirrors" by Bruno Schweig, published by Pelham Books, London in 1973. A crystal of diatomic iodine is placed on a surface, such as a benchtop. Spacers, such as matchsticks are used to hold silver panels 1–2 mm above the crystals, without touching them. The silver layer of the panels face downward toward the crystals. After a few minutes, the iodine vapors convert the silver metal to silver iodide, leaving a transparent hole in the silver film. On the silvered panel with the tin precipitate, this hole did not form as readily, and the pattern of rings left on the silver surface was very deformed and obscured. There were small areas of the silver that the tin precipitate protected completely from the reactive vapor. The tin precipitate appeared to inhibit the reaction between the silver and the iodine vapor.

EXAMPLE 2

Example I was repeated using the cation and anion solutions shown in the following Table 2.

TABLE 2

| RUN No. | CATION SOLN. | CONC. (mM) | ANION SOLN. | CONC. (mM) | EDGE FAILURE SALT ($\mu$m) | EDGE FAILURE CASS ($\mu$m) |
|---|---|---|---|---|---|---|
| 13 | $Ag(NH_3)_2NO_3$ | 1.47 | $(NH_4)_2CO_3$ | 10.4 | 675 | 96 |

These results are comparable to the controls of Example 1 and show the increased corrosion resistance of the silver coated glass treated according to the invention.

EXAMPLE 3

Example I was repeated using the cation and anion solutions shown in the following Table 3.

TABLE 3

| RUN No. | CATION SOLN. | CONC. (mM) | ANION SOLN. | CONC. (mM) | EDGE FAILURE SALT ($\mu$m) | EDGE FAILURE CASS ($\mu$m) |
|---|---|---|---|---|---|---|
| 14 | $Ce_2(SO_4)_3$ | 3.01 | $Na_2CO_3$ | 14.1 | 510 | 1450 |
| 15 | $Ce(NO_3)_3$ | 1.15 | $Na_2HPO_3$ | 4.62 | 420 | 72 |
| 16 | $Ce(NO_3)_3$ | 1.15 | $Na_2HPO_3$ | 2.31 | 222 | 90 |

These results are comparable to the controls of Example 1 and show the increased corrosion resistance of the silver coated glass treated according to the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for making mirrors wherein the mirror comprises a glass substrate and a reflective metallic film layer on the glass substrate comprising:

supplying a glass substrate;
   sensitizing the glass substrate;
   coating a layer of silver on the glass substrate; contacting the silver coated glass substrate with an acidic solution containing a specified cation and an alkaline solution containing a specified anion, or alkaline material which forms hydroxyl ions, by spraying or otherwise directing streams of the solutions so that the two solutions meet at the silver surface, the specified cation and specified anion or hydroxyl ion being reactive to form a water insoluble precipitate on the silver surface, which precipitate enhances the corrosion resistance of the silver layer.

2. The method of claim 1 wherein the specified cation of the acidic solution is selected from the group consisting of $Sn^{2+}$, $Sn^{4+}$, $Bi^{3+}$, $Ag^+$, $Zn^{2+}$, $Pb^{2+}$, $Ce^{3+}$, $Al^{3+}$, $Fe^{2+}$, $In^{3+}$, $Ti^{3+}$ and $La^{3+}$.

3. The method of claim 2 wherein the specified anion of the alkaline solution is selected from the group consisting of $OH^-$, $CO^{2-}_3$, $HPO^{2-}_3$, $SiO^{2-}_3$ $B_4O_7^{2-}$ and $BO_2^-$ alkaline materials which form hydroxyl ions.

4. The method of claim 3 wherein the acidic solution is $SnCl_2$ or $SnF_2$ alone or acidified with HCl or $H_2SO_4$.

5. The method of claim 4 wherein the alkaline solution is NaOH or $NH_4OH$.

6. The method of claim 1 wherein the acidic solution and alkaline solution simultaneously contact the silver surface.

7. The method of claim 1 wherein either the acidic solution or alkaline solution first contacts the silver surface followed by contacting with the other solution.

8. A method for enhancing the corrosion resistance of a silver surface comprising:

contacting the silver surface with an acidic solution containing a specified cation and an alkaline solution containing a specified anion, or alkaline material which forms hydroxyl ions, the specified cation and specified anion or hydroxyl ion reacting to form a water insoluble precipitate on the silver surface.

9. The method of claim 8 wherein the silver surface is the reflective layer of a mirror which has a glass substrate.

10. The method of claim 9 wherein the acidic solution comprises tin ions.

11. The method of claim 10 wherein the alkaline solution comprises OH ions.

* * * * *

UNITED STATES PATENT AND TRADEMARK OFFICE
CERTIFICATE OF CORRECTION

PATENT NO. : 6,017,580
DATED : January 25, 2000
INVENTOR(S) : Joseph Soltys

It is certified that error appears in the above-identified patent and that said Letters Patent is hereby corrected as shown below:

In column 7, Table 1, Run No. 3, delete "6.3" and substitute therefor - - 6.23 - - .

Signed and Sealed this

Twenty-sixth Day of September, 2000

Attest:

Q. TODD DICKINSON

*Attesting Officer*     *Director of Patents and Trademarks*